(12) United States Patent
Tin (10) Patent No.: US 7,001,526 B1
(45) Date of Patent: Feb. 21, 2006

(54) OPTICAL ISOMER SEPARATION METHOD

(76) Inventor: Hla Ngwe Tin, 2281 Golden Cir., Newport Beach, CA (US) 92660

( * ) Notice: Subject to any disclaimer, the term of this patent is extended or adjusted under 35 U.S.C. 154(b) by 206 days.

(21) Appl. No.: 10/375,664

(22) Filed: Feb. 27, 2003

Related U.S. Application Data (60) Provisional application No. 60/361,049, filed on Feb. 28, 2002.

(51) Int. Cl.
  B01D 9/02 (2006.01)
  B01D 17/00 (2006.01)
(52) U.S. Cl. .............. 210/745; 210/774; 23/295 R; 23/296; 23/297; 436/171
(58) Field of Classification Search ........... 210/767, 210/774, 745; 23/296, 295 R, 297; 422/245.1, 422/82.05; 700/273; 73/863.21; 436/171; 356/326
  See application file for complete search history.

(56) References Cited

U.S. PATENT DOCUMENTS

| | | | | |
|---|---|---|---|---|
| 4,169,678 A | * | 10/1979 | Inoue et al. .............. 356/321 |
| 4,494,871 A | * | 1/1985 | Futekov et al. .......... 356/315 |
| 5,077,217 A | * | 12/1991 | Matson et al. ............ 435/280 |
| 5,196,568 A | * | 3/1993 | Zepp et al. ............... 560/110 |
| 5,504,221 A | * | 4/1996 | Yeng et al. ............... 549/435 |
| 5,593,894 A | * | 1/1997 | Purdie ....................... 436/71 |
| 6,002,477 A | * | 12/1999 | Hammer .................... 356/307 |
| 6,123,316 A | * | 9/2000 | Biegelsen et al. ...... 251/129.01 |

* cited by examiner

Primary Examiner—Ernest G. Therkorn (57) ABSTRACT

Methods for separation of two optical isomers in a racemate into its constituent isomers by statistical means are described, whereby the saturated racemate solution is first allotted into small samples by means of microfluidic or inkjet techniques to obtain small sample quantities (picoliters to microliters) with one isomer in measurable excess of the other. The samples are then tested by means of spectrophotometers used for measuring Cotton Effects or Circular Dichroism or other related effects which measure the difference in the absorption of right and left circularly polarized light, so that there is a predetermined minimum excess of one enantiomer. Collecting them in three different receptacles then separates the three types of samples. The right and left excess samples are then used in the crystallization process to obtain right or left handed isomers respectively. The third type of sample that is collected is again re-circulated through the sampling process so that right and left excess samples are collected again out of the neutral samples (with less than minimum excess of one kind or the other) and the process continued to crystallize out the two isomers.

11 Claims, 7 Drawing Sheets

Schematic diagram of optical separation system.

Figure 1. Optical rotatory dispersion curves as would be obtained in (a) optically inactive media and (b) optically active media.

Figure 2. The Cotton effect in an absorption-frequency region.

Figure 3. The general design of a circular dichroism spectrophotometer.

Figure 4. Polarized excitation and luminescence techniques (a)

Figure 5. Flow cell with inkjet/microfluidic cell

Figure 6. Recycling and separation of optical isomers

Fig.7. Schematic diagram of optical separation system.

OPTICAL ISOMER SEPARATION METHOD

CROSS-REFERENCE TO RELATED APPLICATION

This application is entitled to the benefit of Provisional Patent Application Ser. No. 60/361,049, filed Feb. 28, 2002.

BACKGROUND OF THE INVENTION

Pasteur as a student examined in detail the supposed isomorphism of the (+) tartrate and the inactive racemate salts. At ambient temperature the inactive sodium ammonium racemate gave hemihedral crystals of two enantiomorphous types, separable by hand sorting, one type having the morphology of the corresponding (+)-tartrate crystals and the other exhibiting mirror-image facets. In solution each crystal type was optically active, the specific rotations having an equal magnitude but opposed signs. The conclusion of Pasteur, that the molecular structures of (+)- and (−)-tartaric acid have mirror-image morphologies, like the corresponding crystal forms, was taken up only 25 years later, notably by Le Bel. Meanwhile, on repeating the work of Pasteur in Italy, at a temperature above the transition point (27degree C.), Scacchi (1865) obtained only one crystal type, with a holohedral form, that of sodium ammonium racemate with both (+)- and (−)-tartrate in a single centrosymmetric lattice.

Before the time of Pasteur, enantiomeric substances were termed 'physical isomers', since they appeared to differ in no respect other than the property of rotating the plane of polarized light in a clockwise or anticlockwise sense. Pasteur added to this property three types of chemical or physical chiral recognition and discrimination, summed up in his review lectures on molecular dissymmetry of 1860. Pasteur coined the term 'dissymmetric' to describe structural forms, which are not superposable by translations and rotations alone upon the corresponding mirror-image structure. The equivalent term 'chiral' (handed) was introduced by Kelvin in his Baltimore lectures of 1884 (Kelvin, 1904). The first type of chiral discrimination identified by Pasteur is the preferential co-crystallization of an enantiomer with its optical antipode, shown by the majority of racemates, which crystallize as such from solution or from the melt. Only some 250 cases have been identified, of the many-thousand studied, where a racemate forms a conglomerate of two enantiomorphous crystal types, each type containing a single optical isomer. These are the relatively rare cases of 'spontaneous resolution by crystallization'. The second of Pasteur's discoveries, diastereomeric discrimination, covers the different chemical and physical properties of salts and other combinations of the two optical isomers in a racemate with a single enantiomer of another chiral substance (+)-A(+)-B and (−) A(+)-B. The unequal solubilities of such diastereomers afford a general procedure for the optical resolution of racemates. The third discrimination, reflecting Pasteur's growing preoccupation with microbiology, appeared in the biochemical selectivity of micro-organisms between the two enantiomers in a racemic mixture, exemplified by the metabolism of specifically the (+)-isomer of racemic tartaric acid by Penicillium moulds.

Diastereomeric discrimination is commonly used to prepare single enantiomers by first reacting the racemate with a diastereomeric catalyst/reactants so as to obtain diastereomeric compounds. These diastereomeric compounds are then separated by making use of their different solubilities in different solvents, or by other physical or chemical techniques.

In some cases microbes are used to separate enantiomers from racemates, where a biochemical reaction is possible.

In this invention we are mostly interested in the first type of separation, where physical methods or physical properties are employed. Due to the two enantiomers being very similar in physical and chemical properties, this has been the very difficult task. Other physical methods include use of circularly polarized light to enrich the preferred handedness of the enantiomers. Differential absorption of the circularly polarized light between the right handed molecule and left handed molecule is also proposed to separate the enantiomers from the racemate by utilizing the momentum transfer of the light in absorbing molecules in overcoming the diffusion process.

Mason describes optical activity in molecular spectroscopy in the reference. In Cotton effect, by using plane-polarized light, Cotton was able to show that there is a reversal of sign of the optical rotation at one wave length (lambda. max) on scanning through an absorption band with respect to wavelength, and found the emerging radiation to be elliptically polarized, on account of the differential absorption of the left circularly polarized LCP and the right circularly polarized RCP components of the incident radiation. For positive Circular Dichroism (CD) absorption, measured as a differential extinction coefficient between left and right circularly polarized light, the optical rotation changes sign from positive at long wavelength to negative at shorter wavelength; with the converse sign change if the CD absorption is negative. One can therefore differentiate between a right-handed and a left-handed sample by measuring the Optical Rotatory Dispersion (ORD) or CD. Measuring systems such as spectrophotometers for CD and circular intensity differential (CID) in the luminescence of the excited molecules are described in the reference by Mason.

Microfluidic systems are fairly new micro-devices and are described in the patents U.S. Pat. Nos. 6,123,316 and 5,962,081 and the references therein. Conduit systems are a critical part of many micron and millimeter scale micro-devices which are widely used in valve-containing microfluidic controls systems, micro-sensors, and micro-machines. Currently, micro-device valves are used in automobiles, medical instrumentation, or process control applications, and in conjunction with appropriate sensors can provide accurate determinations of pressure, temperature, acceleration, gas concentration, and many other physical or chemical states. Microfluidic controls include micro-valves for handling gases or liquids, flow gauges, and ink jet nozzles, while micro-machines include micro-actuators, movable micro-mirror systems, or even tactile moving assemblies. In part because of the ease of associating and integrating electronic control circuitry (using VLSI techniques), micro-devices are commonly constructed from glasses or semiconductor material substrates such as crystalline silicon, commercially available in the form of semiconductor wafers used for production of integrated circuits. Lately, the substrates have been fabricated with molded plastic materials and are described in the Nanostream, Inc. brochures and literature. Microfluidic systems make it possible to make and transport samples with pico-liter quantities.

Many commercial inkjet printers started to appear about a decade ago. At the present time the resolution of these printers are so good that United States Treasury has been redesigning its paper currency so that the printers will not be able to reproduce them so that they can use the counterfeits as passable currency. The commercial printers are manufactured by Hewlett-Packard, Lexmark, Hitachi and Xerox and were adapted from the thermal bubble technology developed by Canon and adding enhancements along the way in their patents. Epson on the other hand use piezoelectric crystals to do the job of the bubbles in inkjet printers. In Epson's line of printers, microscopic piezoelements subjected to tiny charges are distorted, pushing out tiny droplets of ink. Modest injet printers have a resolution of about 300 dots per inch. High-resolution printers made by Hewlett Packard and Hitachi are 1200 dots/inch. Also about 5000 or more droplets can be squirted in a second in a precise manner. Scientists at MIT and Sandia National laboratories have been able to put molecules into a solution and squirted out onto various surfaces with an inkjet printer to form pattern designed by a computer and in very small quantities. Very recently also, scientists at University of North Carolina have been able to design software to be able to make inkjets that has smaller droplet sizes from the same injectors.

Hammer and Inoue, et. al, have described spectrophotometers recently in the two patents U.S. Pat. Nos. 6,002,477 and 4,169.678. respectively. A commercial model is also described in the Varian Cary spectophotometers by Varian, where phosphorescence data can be captured every microsecond where sensitivity of pico-molar concentrations are measured with ease.

Purdie in U.S. Pat. No. 5,593,894 described an invention relating to the direct quantitative determination of cholesterol and involves the formation of a spectrophotometrically active product of cholesterol obtained by contacting cholesterol with an acyl compound and a perchlorate effective to form the spectrophotometrically active product.

Futekov et. al, in U.S. Pat. No. 4,494,871 described a dosing device for emitting liquid samples to an automatic absorption spectrophotometer having a liquid atomizer for the samples, utilizes at least one three-way distributor, one of the ports of which communicates with the atomizer, another port of which communicates with the spectrophotometer, and a third part of which communicates with a vessel containing the liquid sample. An electromagnetic valve is provided for the port communicating with the atmosphere. In the preferred embodiment, two such distributors are provided in series and the second distributor is connected to a source of pure solvent and is interposed between the first distributor and the spectrophotometer.

Biegelsen, et. al, in U.S. Pat. No. 6,123,316 described conduit system for a valve array whereby the fluid conduit systems is constructed in printed circuit boards or other dielectric laminate substrates. The fluid conduits can be angled or curved to provide greater directional control of fluid flow. Conduits are created by lamination of a first laminate layer and a second laminate layer. The first laminate layer is composed of a dielectric base material impregnated with a resin, with a first aperture defined therethrough, while the second laminate layer has a second aperture. The second aperture is positioned with respect to the first aperture to only partially overlap, together defining an angled conduit. Fluid flow through the conduits can be controlled using microdevice valves.

Ohman et. al, in U.S. Pat. No. 5,962,081 described a method for the manufacture of a microstructure having a top face and a bottom face, at least one hole or cavity therein extending from the top face to the bottom face, and a polymer membrane which extends over a bottom opening of said hole or cavity, which method comprises the steps of: providing a substrate body having said top and bottom faces, optionally forming at least part of said at least one hole or cavity in the substrate body, providing a membrane support at the bottom face opening of said at least one hole or cavity, depositing a layer of polymer material onto the bottom face of said substrate body against said membrane support, if required, completing the formation of the at least one hole or cavity, and, if not done in this step, selectively removing said membrane support to bare said polymer membrane over the bottom opening of the at least one hole or cavity.

Yeng, et. al, in U.S. Pat. No. 5,504,221 described a method for resolving racemic dimethyl-4,4'-dimethoxy-5,6, 5',6'-di(methylenedioxy)biphenyl-2,2'-dicarbox ylate ("DDB"), in which a chiral .alpha.-alkyl benzyl alcohol is used as the resolving agent. More specifically, racemic DDB is first hydrolyzed to form dicarboxylic acid, which is then reacted with chiral .alpha.-alkyl benzyl alcohol to form two chiral isomers. The chiral isomers, after separation either by chromatography or by recrystallization, are respectively hydrogenated and esterified to form chiral DDB isomers.

Zepp, et al, in U.S. Pat. No. 5,196,568 described an invention relating to novel compositions of matter, which are esters with enhanced water solubility, for use in aqueous enzymatic resolution reactions of racemic mixtures of these esters for producing the separate chiral isomers of the racemic mixture. The invention also relates to novel methods for preparing these esters. The importance of the production of the separate chiral isomers of the racemic mixtures resides in the isolation of the isomers that frequently have different biological activities. Of particular significance regarding the water-soluble esters of this invention is that they are derivatized with groups, which enhance their aqueous solubility and their reactivity with enzymatic resolving methods, which are mediated in an aqueous environment. In addition, the importance of these compounds resides in their being useful in novel methods for facilitating the enzymatic resolution reactions of racemic mixtures of esters, which are derivatized with groups which enhance the esters' aqueous solubility, in 1) a homogeneous aqueous reaction system where an extractive phase is not present, 2) a multiphase dispersion extractive reaction where an extractive phase is present, and 3) an extractive membrane reactor where the enzyme is placed alternatively either (a) in the aqueous phase, (b) in association with the membrane, or (c) in the aqueous phase and in association with the membrane, wherein the aqueous ester phase is contacted with one side of the membrane, and where an organic extractive phase is contacted with the other side of the membrane, wherein the extractive phase serves to remove the resolving reaction product.

Matson, et al. in U.S. Pat. No. 5,077,217 described a method for membrane reactor resolution of stereoisomers.

This invention relates to novel methods for facilitating the enzymatic resolution of racemic mixtures of esters, which are derivatized with groups which enhance the esters' aqueous solubility, in an extractive member reactor where the enzyme is placed alternatively either (1) in the aqueous phase, (2) in association with the membrane, or (3) in the aqueous phase and in association with the membrane, wherein the aqueous ester phase is contacted with one side of the membrane, and where an organic extractive phase is contacted with the other side of the membrane, wherein the extractive phase serves to remove the resolving reaction product. Of particular significance regarding this invention is its use of water-soluble esters that are derivatized with groups, which enhance their aqueous solubility and their reactivity with enzymatic resolving methods, which are mediated in an aqueous environment. Novel methods were utilized to prepare these esters, for use in this invention's methods for enzymatically resolving the racemic mixtures of the esters, to produce the separate chiral isomers of the racemic mixture. The importance of the resolution of the separate chiral isomers of the racemic mixtures resides in the isolation of the isomers that frequently have different biological activities.

Mills, W. H., in Chem. Ind., 1932, 5, 750–59, used statistical model to explain how a racemate is formed from an achiral starting material where the formation of a small excess of one of the enanatiomers has a significant probability.

Rhinehart, E. A., et al, in UC LLL Report—UCRL51833, Apr. 14, 1975 described Bulk Atomic or Molecular Separations by Resonant Radiation Pressure.

Lethokov, V. S., in Opt. Comm. 1973, 7, 1, 59–60 described an optical separation of isomeric nuclei by laser radiation.

Shuming N., et al, in Anal. Chem. 1995, 67,2849–2857 described the real-time detection of single molecules in solution by confocal fluorescence microscopy, indicating how small sample quantities of chemicals can be detected by optical means.

Chung-yi, K., et al, in Appl. Opt., 1999, 38,9 1481–1487 described instrumentation for real-time detection of single-molecule fluorescence in guided streams of 1-micro-meter water droplets. Target molecules were confined to droplets whose volumes were comparable with illumination volumes in diffraction-limited fluorescence microscopy and guided to the waist of cw probe laser.

Chen A. U., et al, Phys. Fluids, 2002, 14, 1, L1–L4 showed a new method for significantly reducing drop radius without reducing nozzle radius in drop-on-demand drop production. Computational and experimental analysis of dynamics of drop formation is also given by one of the authors (Barasan) in previous publications mentioned in the references.

SUMMARY OF THE INVENTION

It is a primary object of the present invention to provide a novel and improved method for separating optical isomers by integrating highly sensitive and fast spectrophotometer with microfluidic and/or inkjet systems utilizing statistical random sampling techniques and physical methods of crystallization. Crystallization provides a collective phenomenon to separate many crystals of one form of crystal to separate out from the solution.

In this invention we found from statistical theories that, in sampling a small enough quantity of racemate, there is indeed a measurable excess of one enantiomer over the other. This type of excess is also described in Mills article to obtain a racemate solution from an achiral mixture by using probability theory. The probability for measurable excess is predicted by using either of the standard methods such as, binomial distribution, hypergeometric distribution or standard normal distribution or a combination thereof. It can also be predicted from well-known Chebychev's Inequality in statistics. The number of molecules needed to give an 80% probability that there will be an excess of 1% for one optical isomers with sigma value of ¼ is estimated at 12,500. The amount of microfluid sampled or allotted from the original macro-racemic mixture will be determined by the sensitivity of the spectrophotometer for measuring the excess of one enantiomer from the other. For instance, if the sensitivity is 5000 molecules then the amount of sample will be about 50,000 molecules for a 10% excess. Actual sample size is determined by estimating the confidence interval used in statistics to give a high probability of achieving the predetermined excess levels.

The present invention provides a practical alternative to the use of statistical methods to sample and separate the very difficult task of separating very similar chemicals where catalytic and chromatographic methods are used, or where biochemicals have to be applied.

Advantageously, the present invention also allows us to substitute the use of a low cost and fast separation method to separate any racemic or other mixtures such as isomeric nuclides and organic compounds, without having to resort to different chemistry for different mixtures.

Additional functions, objects, advantages, and features of the present invention will become apparent from consideration of the following description and drawings of preferred embodiments.

DESCRIPTION OF THE PREFERRED EMBODIMENTS

Figure 1:
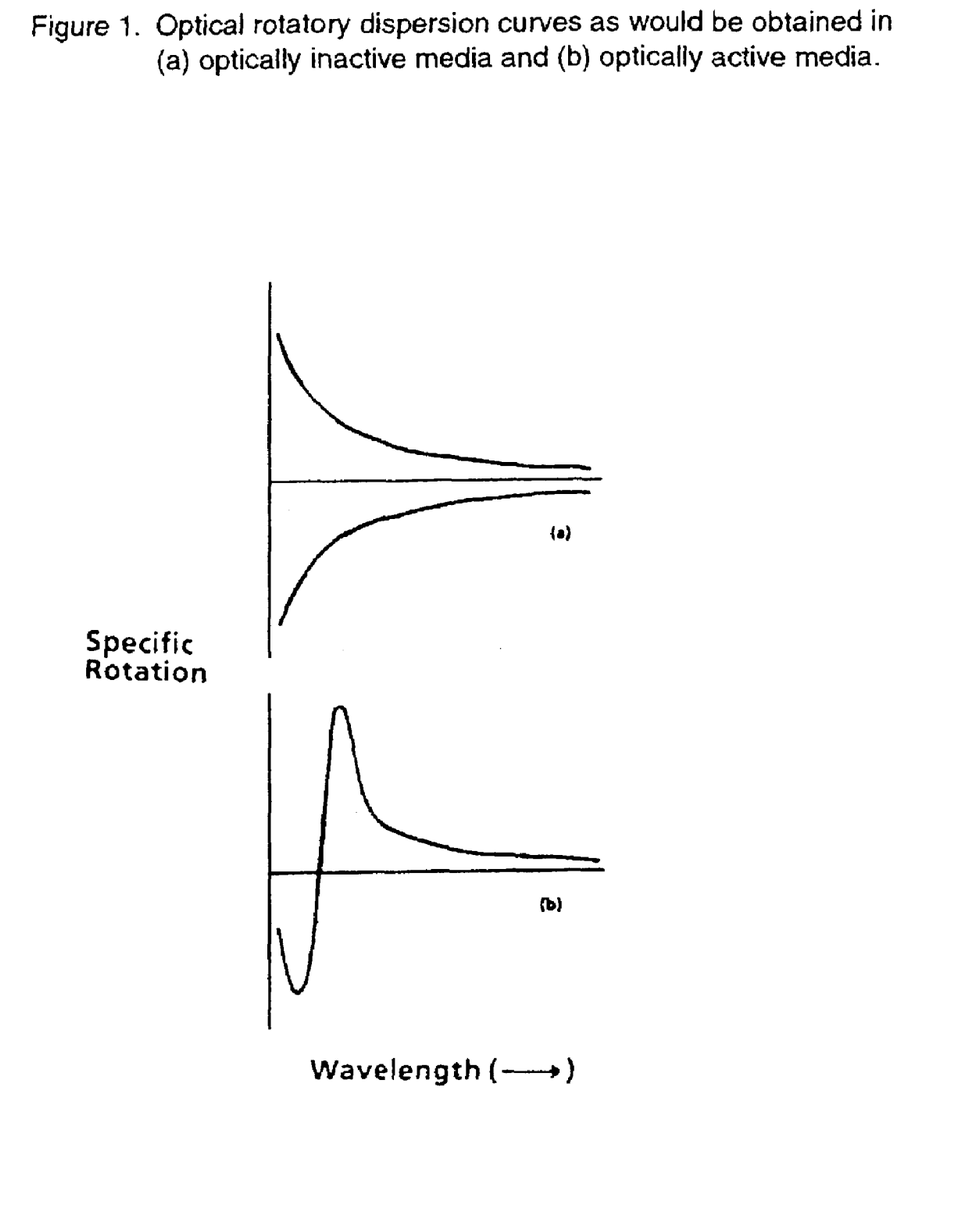
FIG. 1 The diagram shows optical rotatory dispersion ORD curve, and shows the difference in refractive index of a substance for left-handed and right-handed circularly polarized light with wavelength. The dispersion reflects the difference in speed between the circularly polarized lights.

In FIG. 1, we have shown the optical activity with the wavelengths leading to an optical rotatory dispersion curve. This means that an ORD curve is a function of the difference in refractive index of a substance for left or right handed circularly polarized light with wavelength. For a compound, which does not have chromophore in the spectral region examined, the optical activity progressively decreased in magnitude as the wavelength increases.

It is also shown that for a specific case, above 300 nm a positive plain ORD curve is obtained.

Figure 2:
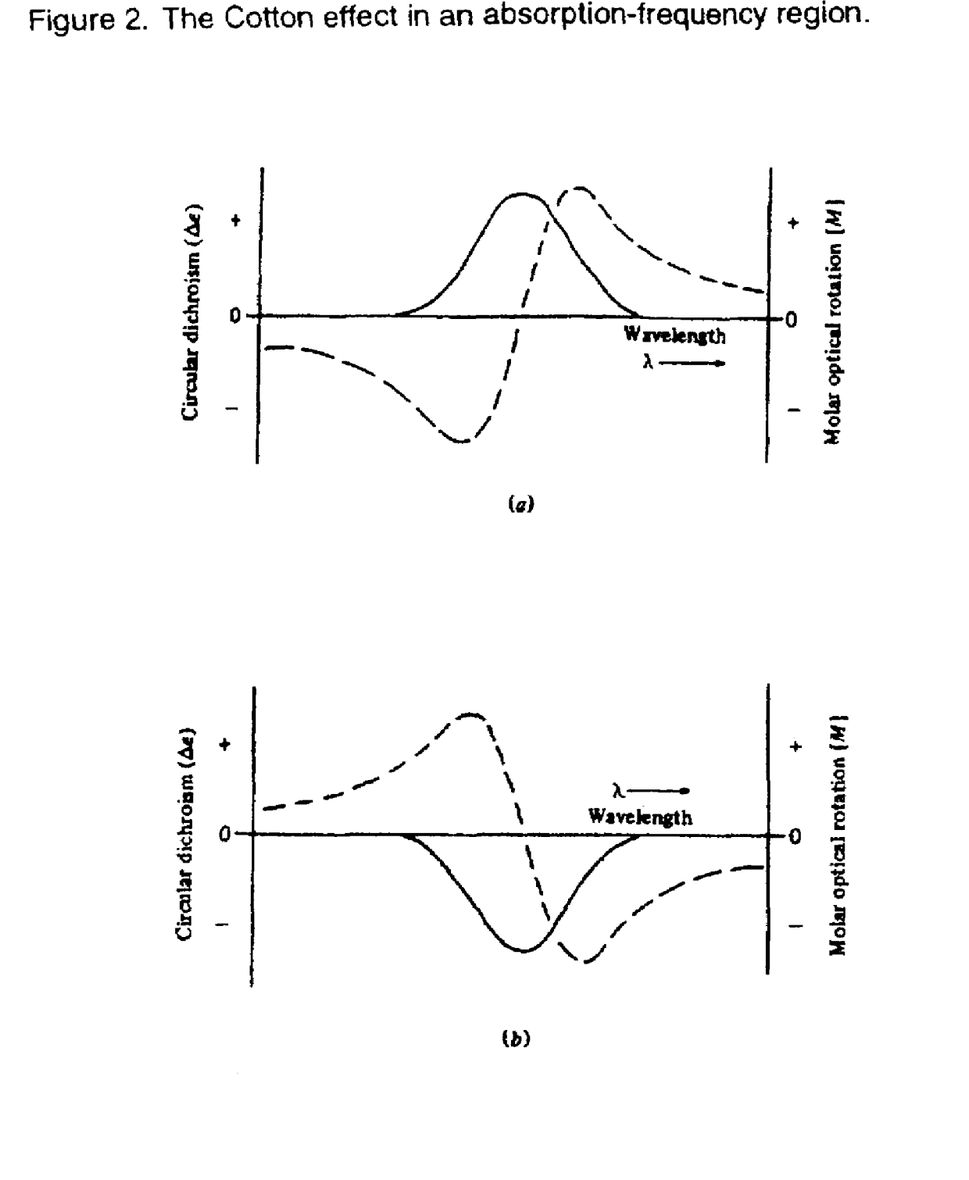
FIG. 2 The diagram shows the Cotton Effect in an absorption frequency region, expressed as the circular dichroism CD (delta epsilon=epsilon.subL-epsilon.subR) full line and the 'anomalous' dispersion of the molar optical rotation [M] broken line. A positive Cotton effect is given by the isomer dextrorotatory at longer wavelengths (a), and a negative Cotton effect by the laevorotatory enantiomer (b). The circular dichroism effect results from the fact that the right circularly polarized ray is differently absorbed from the left circularly polarized beam of light.

If a compound presents one or several optically active absorption bands, its ORD curve will show peaks or troughs in the spectral region in which the chromophores absorb, and the ORD curve is called the Cotton Effect curve. This is illustrated in FIG. 2.

Figure 3:
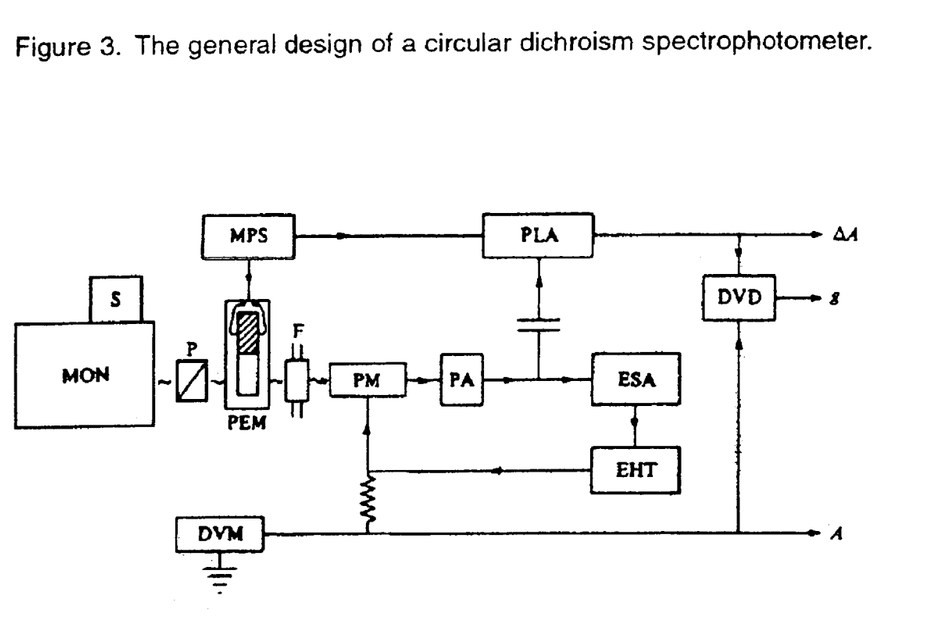
FIG. 3 The diagram shows the general design of a circular dichroism spectrophotometer.

FIG. 3. shows the general design of a spectrophotometer to measure Circular Dichroism (CD). White radiation from a source (S) 1 enters the wavelength scanning monochromator (MON) 2. Radiation from the monochromator 1 exit slit passes through a polarizing prism (P) and a photo-elastic quarter-wave modulator (PEM) to a flow-cell (F), for kinetic or chromatographic studies. The transmitted radiation is detected by the photomultiplier (PM). After the pre-amplifier (PA), the PM signal is fed to the error-signal servo-amplifier (ESA) which governs the extra high-tension-voltage supply (EHT) to the PM, in order to maintain the V sub. ac. constant at a preset level. A signal proportional to the change in the (EHT) supply, registered by the digital voltmeter (DVM), is fed to one channel of a multi-pen recorder to measure the absorbance, A. The V sub.ac signal from the (PM), after the PA is fed to the phase lock amplifier (PLA), which receives a reference signal from the modulator power, supply (MPS). The output from the (PLA) is fed to a second channel of the recorder to measure the circular dichroism absorbance, delta A=(A sub.1–A sub.r), and to one input in the ratio-meter, the divider (DVD). The second input to the (DVD) is the absorbance signal, and the DVD output measures the g-ratio, delta A/A, which is registered by a third channel of the recorder.

Figure 4:
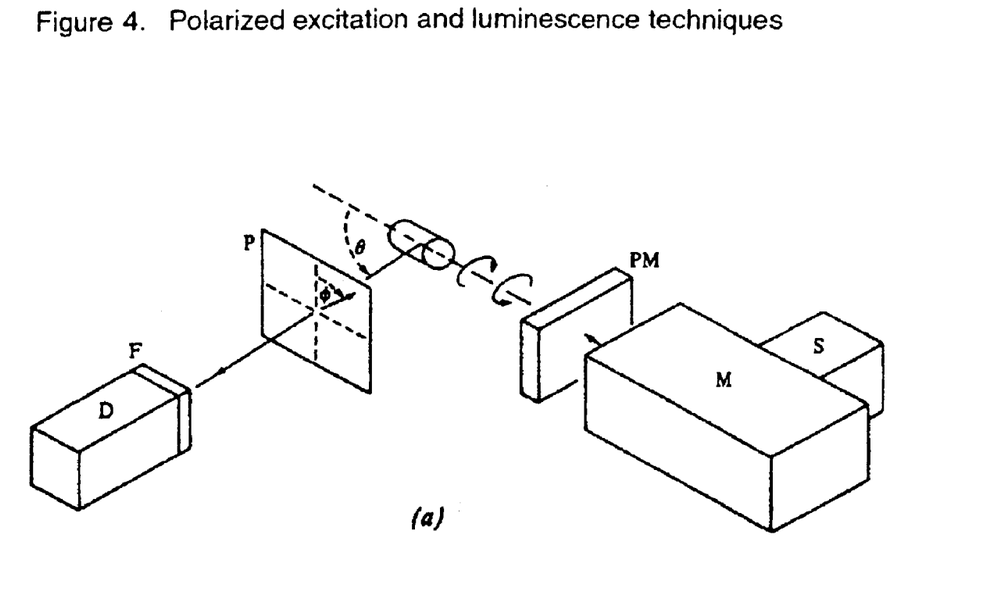
FIG. 4. The diagram shows a polarized excitation and luminescence technique, where fluorescence-detected circular dichroism is shown.

FIG. 4. Polarized excitation and luminance techniques using, the fluorescence-detected circular dichroism procedure. The sample luminescence is excited by monochromatic radiation, provided by the radiation source (S), and monochromator (MON), periodically LC and RC polarized by the polarizer-modulator combination (PM). The luminescence is transmitted through the linear polarizer (P), and the cut-off filter (FLT), to the detector (D). Linear polarization effects arising from the photoselection of solute molecules with a particular orientation are minimized by setting the transmission vector of the polarizer (P), at the angle phi=35.25 degrees to the excitation-emission plane normal, or by collecting the fluorescence in a direction at the angle theta=54.75 or 125.25 degrees to the excitation propagation direction.

Figure 5:
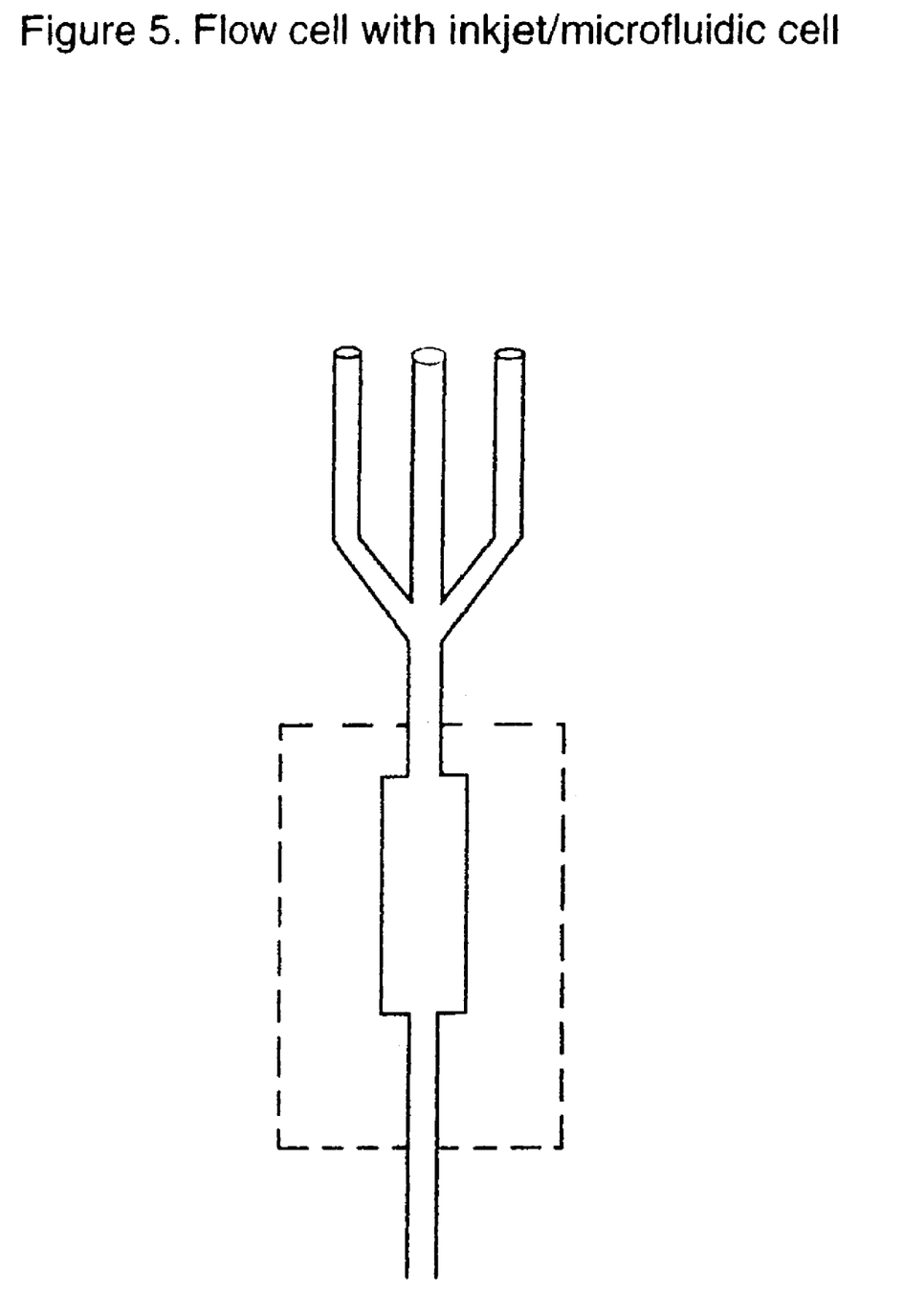
FIG. 5 The diagram shows a modification of the general design of the CD spectrometer where the flow cell is replaced with a microfluidic cell (or an inkjet system) with three out lets on the outlet side with one inlet.

FIG. 5. The flow cell (F), is used in conjunction with an inkjet system or microfluidic cell with three outlets on the outlet side and with one inlet. One of the outlet right output (RO) 16, which injects to a collector passes samples that has a predetermined excess of one isomer, and the other left output (LO), injects samples that has a deficit of the isomer that is being detected; with the remaining samples (RS), collected in a container for further recycling and separation into its components as described for the racemic mixture.

Figure 6:
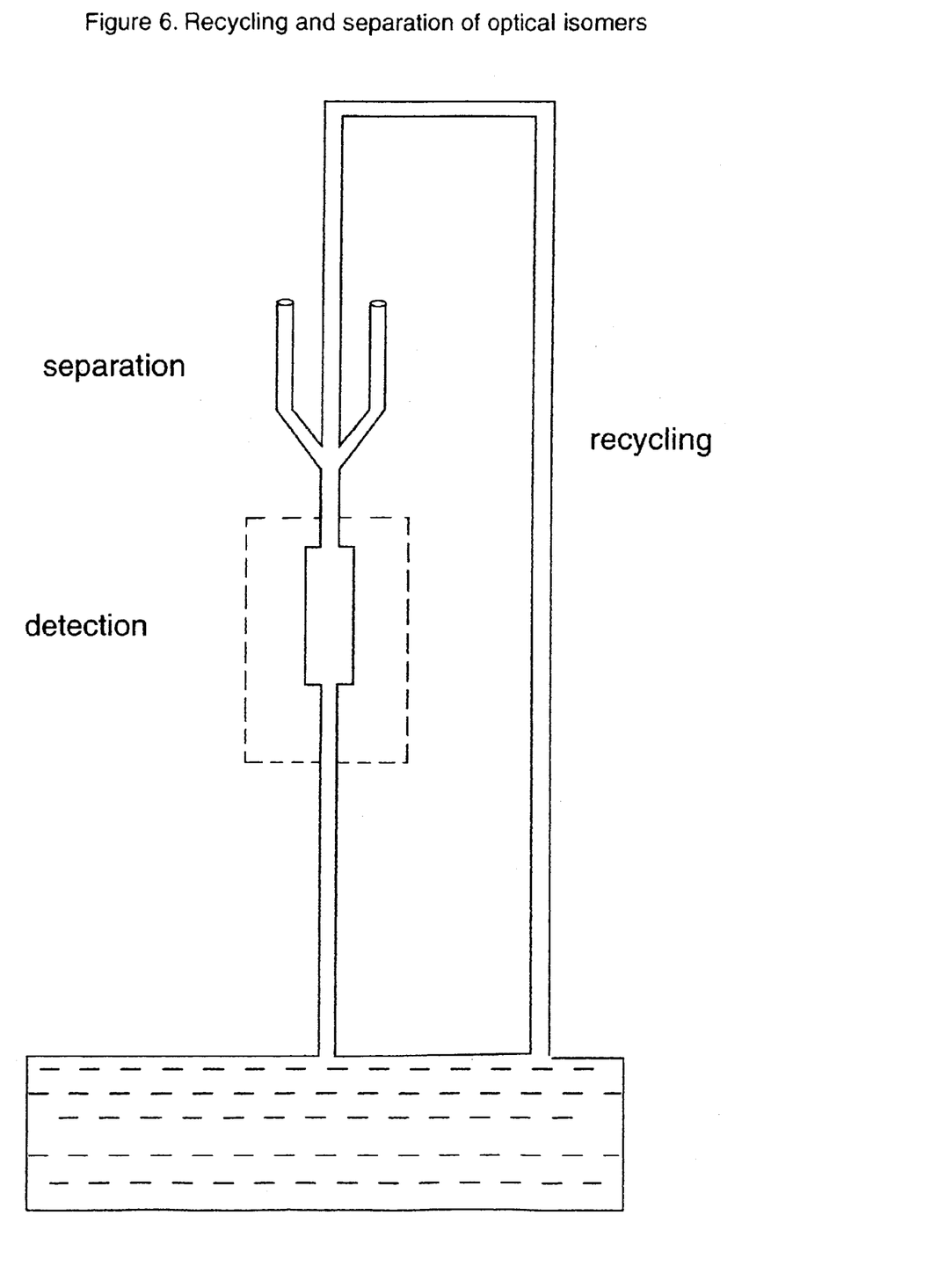
FIG. 6. The diagram shows three outlets discharging to three collection receptacles, one of which is connected back to the inflow vessel for recycling.

FIG. 6. The neutral samples (RS), 18, with neither a predetermined excess nor deficit are recycled into the racemic container for further separation in the system.

Figure 7:
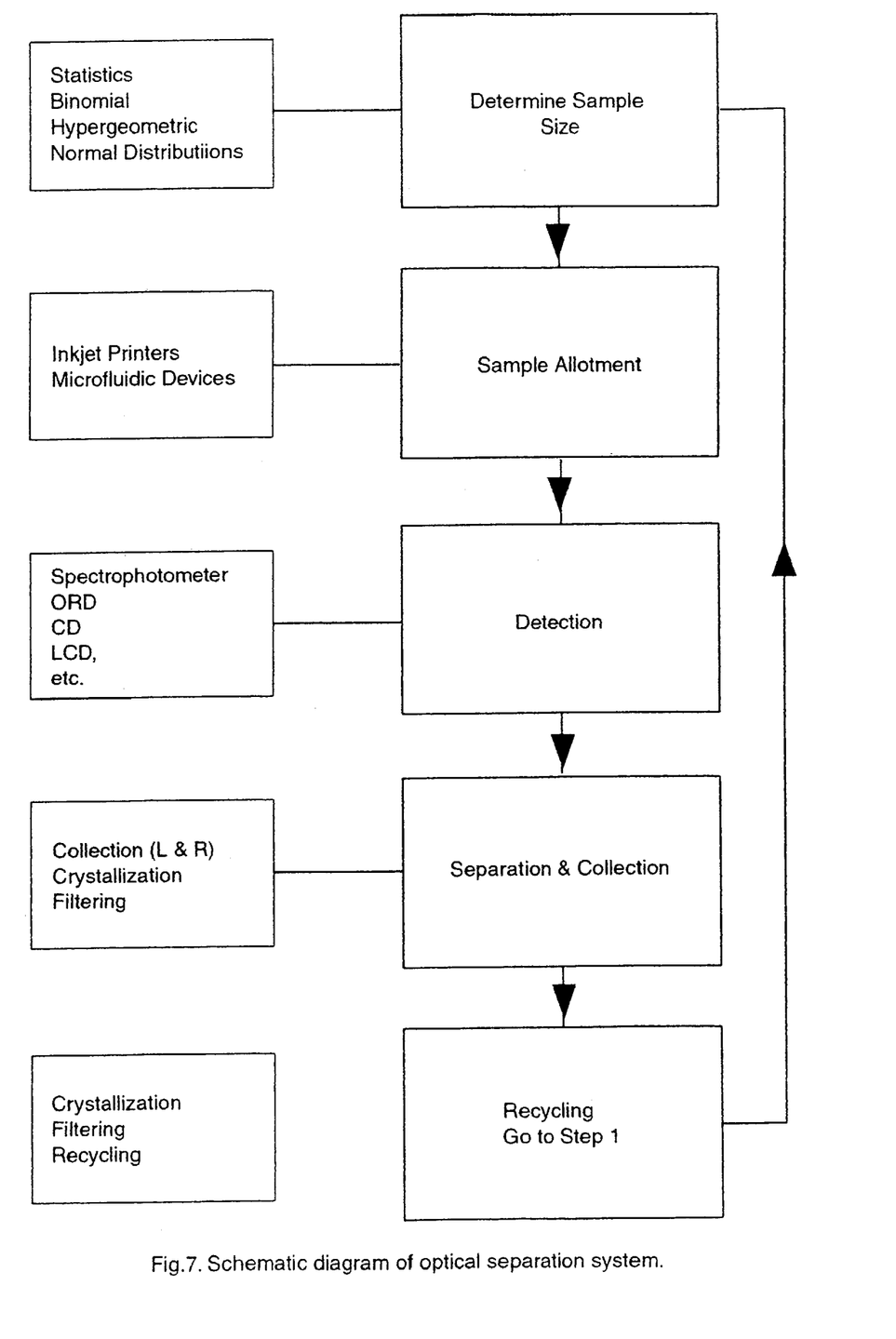
FIG. 7. The diagram shows the flow diagram of the process of separation using the statistical method of separating optical isomers by crystallization.

FIG. 7. Shows a schematic diagram of how the optical isomer separation system works. The right hand column describes the various processes (top to bottom) and left hand column are methods used in each process. To determine the sample size, statistical methods are used. In this particular case, binomial, hypergeometric and normal distribution functions and Chebychev's Inequality can be used to estimate this number. In order to have the excesses needed for separation or enrichments, confidence levels are established and used in the estimation of sample sizes using statistical principles. In order to achieve proper sample allotment and transport, inkjet techniques and microfluidic systems are utilized. The samples in the (F) flow-cells are then detected using spectrophotometer with very high sensitivities to look at ORD, CD, LCD etc., effects. Once the samples with the predetermined excesses are detected, then, they are collected in the containers for crystallization. The remaining neutral samples are recycled for further separation as described before, until most of the sample is separated.

INDUSTRIAL APPLICABILITY

The statistical methods used in this invention is a practical method to sample and separate the very difficult task of separating very similar chemicals where catalytic and chromatographic methods are used, or where biochemicals methods have to be applied.

It also allows us to substitute the use of a low cost and fast separation method to separate or enrich any mixture such as isomeric nuclides and organic compounds, without having to resort to different chemistry for different mixtures.

The foregoing describes only some embodiments of the present inventions, and modifications obvious to those skilled in the art can be made thereto without departing from the scope of the present invention.

The invention claimed is:

1. A method of physical separation of optical isomers from a saturated racemate solution comprising the steps of
    a) first allotting the racemate solution into samples with minute quantities of the racemate resulting in one isomer in measurable excess of the other using statistical means, and
    b) detecting the samples with a predetermined excess by means of a spectrophotometer that measures the different responses to the left and right circularly polarized light,
    c) collecting the samples, one with predetermined left handed excess, another with predetermined right handed excess and the rest, in three different receptacles,
    d) crystallizing the two samples that have excesses larger than the predetermined excess amount of left or right-handed isomers to obtain the left or the right isomers by lowering the temperature if necessary,
    e) allowing natural crystallization of the third portion of the samples to occur,
    f) inducing crystallization of the third sample to occur by known means,
    g) removing the crystals from the mother liquor and
    h) then recirculating the remaining portion for further separation and crystallization as described previously from a) to g).

2. A method as in claim 1, wherein the racemate solution is allotted in small portions from picoliters to microliters using inkjet printing techniques so that there is a minimum prescribed probability of one isomer in measurable excess of the other in the samples.

3. A method as in claim 2, wherein the racemate solution is allotted in small portions from picoliters to microliters using microfluidic techniques so that there is a minimum prescribed probability of one isomer in measurable excess of the other in the samples.

4. A method as in claim 2 or 3, wherein the portion to be allotted is determined by statistical methods, including, binomial distribution of random numbers and variables, hypergeometric distribution formula, normal distribution formula, Chevbychev's Inequality, and a confidence interval method used in statistics.

5. A method as in claim 4, wherein the allotted portions are detected for their excess of one isomer over the other by means of spectrophotometer with a sensitivity of pico-molar to micro-molar concentrations and having very fast rate of detection (microsecond/detection), whereby the detection is made highly sensitive for small samples, and with a fast throughput rate.

6. A method as in claim 5, wherein measurements are made for the Cotton Effects or the Circular Dichroism or other related effects including the Luminescence Circular Dichroism, that measures the molecular absorptions of the left and right handed molecules, whereby the detection of the excesses of each thereof is achieved, and throughput is enhanced.

7. A method as in claim 6, wherein the detected samples with excesses and those with almost equal number of left and right handed molecules are then collected in three separate receptacles by using microfluidic methods, whereby small samples are adequately separated and collected and made available for crystallization and re-circulation in three basic groups.

8. A method as in claim 7, wherein the two collected samples with predetermined excesses are then crystallized into right handed and left handed molecular crystals, whereby separation of left or right handed isomers in the mother liquor is accomplished.

9. The method of claim 7, wherein the third collection of samples with almost equal number of left or right handed molecules are circulated back to the original sample container and then allotted, tested and separated again for excess samples and then crystallizing the samples with excesses, and repeated until most of the third sample mixture is separated, whereby separation of left or right handed isomers in the mother liquor is accomplished.

10. The method of claim 7, wherein the third collection of samples with almost equal number of left and right handed molecules are used to crystallize out one enantiomer by lowering the temperature, whereby separation of left or right handed isomers in the mother liquor is accomplished.

11. The method of claim 1, wherein the left or right handed isomers in crystal form are separated from the mother liquor by known physical and chemical means, includes filtering process, whereby separation of the crystals from the mother liquor is accomplished.

* * * * *